(12) United States Patent
Son

(10) Patent No.: US 8,759,420 B2
(45) Date of Patent: Jun. 24, 2014

(54) MARBLE CHIPS FOR AN ARTIFICIAL MARBLE, METHOD OF MAKING THE SAME, AND ARTIFICIAL MARBLE INCLUDING THE SAME

(75) Inventor: Chang Ho Son, Yeosu-si (KR)

(73) Assignee: Cheil Industries Inc., Gumi-si (KR)

( * ) Notice: Subject to any disclaimer, the term of this patent is extended or adjusted under 35 U.S.C. 154(b) by 236 days.

(21) Appl. No.: 13/151,713

(22) Filed: Jun. 2, 2011

(65) Prior Publication Data

US 2011/0263783 A1 Oct. 27, 2011

Related U.S. Application Data

(63) Continuation-in-part of application No. PCT/KR2009/007275, filed on Dec. 7, 2009.

(30) Foreign Application Priority Data

Dec. 15, 2008 (KR) .......................... 10-2008-0127515

(51) Int. Cl.
*C09D 5/29* (2006.01)

(52) U.S. Cl.
USPC .......................................................... 523/171

(58) Field of Classification Search
USPC .......................................................... 523/171
See application file for complete search history.

(56) References Cited

U.S. PATENT DOCUMENTS

| | | | |
|---|---|---|---|
| 6,335,060 B1 | 1/2002 | Inoue | |
| 6,855,415 B2 | 2/2005 | Lilly | |
| 7,195,857 B2 | 3/2007 | Tamura et al. | |
| 7,935,744 B2 | 5/2011 | Kim et al. | |
| 7,981,948 B2 * | 7/2011 | Son et al. | 523/171 |
| 2006/0036010 A1 | 2/2006 | Kim et al. | |
| 2006/0217033 A1 | 9/2006 | Sung et al. | |

FOREIGN PATENT DOCUMENTS

| | | |
|---|---|---|
| EP | 0916705 A2 | 5/1999 |
| JP | 02-036218 A | 2/1990 |
| JP | 07-033839 A | 2/1995 |
| JP | 09-227189 A | 9/1997 |
| JP | 11-209447 A | 8/1999 |
| JP | 11-236516 A | 8/1999 |
| JP | 2001-098038 A | 4/2001 |
| JP | 2005-097424 A | 4/2005 |
| KR | 10-0383254 B1 | 4/2003 |
| KR | 2003-0097780 A | 12/2003 |
| KR | 10-2004-0005044 A | 1/2004 |
| KR | 10-2004-0059913 A | 7/2004 |
| KR | 10-2006-0014764 A | 2/2006 |
| KR | 10-0555441 B1 | 2/2006 |
| KR | 10-0562634 B1 | 3/2006 |
| KR | 10-2007-0001308 A | 1/2007 |
| KR | 10-0728589 B1 | 6/2007 |
| WO | 2010/071314 A2 | 6/2010 |

OTHER PUBLICATIONS

Machine Translation of KR 10-0728589.*
International Search Report in counterpart International Application No. PCT/KR2009/007275 dated Jul. 15, 2010, pp. 1-4.

* cited by examiner

*Primary Examiner* — Nicole M Buie-Hatcher
*Assistant Examiner* — Chelsea M Lowe
(74) *Attorney, Agent, or Firm* — Additon, Higgins, Pendleton & Ashe, P.A.

(57) ABSTRACT

The present invention provides marble chips produced by hardening or molding a resin composition including a binder and a reactive monomer, wherein the binder comprises a halogenated alkoxylated diacrylate oligomer. The marble chips of the present invention can be formed into a uniform pattern, so that an artificial marble made using the marble chips of the present invention may have an outer appearance and texture similar to that of engineered stone.

25 Claims, 1 Drawing Sheet

US 8,759,420 B2

MARBLE CHIPS FOR AN ARTIFICIAL MARBLE, METHOD OF MAKING THE SAME, AND ARTIFICIAL MARBLE INCLUDING THE SAME

CROSS-REFERENCE TO RELATED APPLICATIONS

This application is a continuation-in-part of International Application No. PCT/KR2009/007275, filed Dec. 7, 2009, pending, which designates the U.S., published as WO 2010/071314, and is incorporated herein by reference in its entirety, and claims priority therefrom under 35 USC Section 120. This application also claims priority under 35 USC Section 119 from Korean Patent Application No. 10-2008-0127515, filed Dec. 15, 2008, in the Korean Intellectual Property Office, the entire disclosure of which is also incorporated herein by reference.

FIELD OF THE INVENTION

The present invention relates to marble chips for an artificial marble, methods of making the same, and artificial marble including the same.

BACKGROUND OF THE INVENTION

Generally, artificial marble can be classified into two groups according to the base resin material used in the same. One group includes acrylic resin-based artificial marble, and the other group includes unsaturated polyester resin-based artificial marble. Acrylic resin based artificial marble can have desirable properties, such as excellent appearance, soft touch, excellent weather resistance, and the like, and thus there is an increased need for acrylic resin based artificial marble for various applications, including surfaces tops and other interior materials.

Generally, acrylic resin based artificial marble is prepared by mixing a mixed syrup of acrylic monomer (such methyl methacrylate and polymethyl methacrylate), inorganic filler, and marble chips (selected to provide a desired color and pattern), dissolving a polymerization initiator therein, and casting the mixture at the appropriate temperature. The acrylic monomer polymerizes to form a matrix with the marble chips dispersed therein Different kinds of marble chips can be used to impart various colors and patterns to the artificial marble. The appearance of artificial marble provided by the marble chips can significantly affect the value of goods made using the same.

The marble chips may be obtained by pulverizing an artificial marble to form chips of various sizes. An acrylic resin, which is the same material used as a matrix for the artificial marble, may also be used as the material for the marble chips.

Recently, transparent marble chips have been used to provide an otherwise-dull artificial marble with a bright and elegant appearance, e.g. a jewel-like appearance. Accordingly, there is an increased need for transparent marble chips.

Typically transparent marble chips have been prepared from polymethylmethacrylate based resin and unsaturated polyester resin. However, such transparent marble chips may have a specific gravity of 1.15 to 1.24, which may be lower than that of the resin matrix used for the artificial marble. As a result, the transparent marble chips may float or migrate to the upper surface of the resin matrix before or during the curing process. This may result in little or no transparent marble chips at an opposite (lower) surface of the artificial stone, and the artificial marble may not exhibit uniform dispersion of the transparent marble chips. In order to compensate for this effect and distribute the transparent marble chips throughout the matrix and to the opposite surface of the artificial marble, more than twice amount of transparent marble chips should be added, which may make it difficult to control the thickness of the artificial marble.

In order to increase the specific gravity of the marble chips to the level of the matrix, inorganic fillers such as aluminum trihydrate, barium sulfate, silica, and the like may be added. However, in this case, the transparency of the marble chips can be significantly deteriorated.

Artificial marble can also be in the form of engineered stones, which are prepared from chips with a transparent appearance, e.g. mineral silica minerals such as quartz, silica, crystal, and the like, or glassy silica compounds such as glass, molten glass, and the like. Artificial marble in the form of engineered stones may have good transparency, but may also have problems resulting from the sedimentation property of the chips.

For example, the Mohs hardness of the acrylic matrix and silica and silica compounds used in engineered stones are different. Typically the artificial marble is cast in the form of a plate and the surface of the plate is sanded. Because the hardness of the matrix material and the chips is different, sanding the plate can result in an uneven surface. Accordingly, it can be difficult to use continuous manufacturing processes to make artificial marble including engineered stones as a chip material.

Accordingly, there is a need for artificial marble chips that can have a high refractive index, the same or similar specific gravity as a matrix material so that the chips can be more uniformly distributed in the matrix, can provide the artificial marble with a regular pattern without regard to the time required to cure the same, and the same or similar abrasion property as the matrix so that the artificial marble can have a good surface flatness and smoothness.

SUMMARY OF THE INVENTION

In order to solve the above-mentioned problems, the present inventors have developed marble chips that can have excellent cohesion with a matrix material. The artificial chips also can have the same or similar specific gravity as a matrix material used in an artificial marble. In exemplary embodiments, the marble chips can have a specific gravity of 1.45 to 1.75.

Further, the marble chips can have the same or similar abrasion property as a matrix material. For example, in exemplary embodiments, the marble chips and the matrix material can have a similar or the same Mohs hardness value. Accordingly, a product formed of the matrix material with the marble chips disturbed therein can be readily surface treated (for example sanded).

In addition, the artificial chips of the invention can have a high refractive index and also can be transparent. The marble chips also can provide a uniform pattern in an artificial marble.

The present invention also provides marble chips that can represent a three dimensional texture, can exhibit excellent pigment dispersion properties and cohesion with a matrix minimal to minimize or eliminate the so-called concave phenomenon, and can provide excellent chemical resistance. The marble chips of the invention also can provide the same or similar appearance and texture to an artificial marble as engineered stone. Still further, the marble chips of the invention can be used in a continuous process to make an artificial marble and can impart excellent thermal processability to the artificial marble.

The present invention further provides a method of making the marble chips.

The present invention further provides artificial marble including the marble chips of the invention. The artificial marble can be readily produced using a continuous process, and the resultant product can have excellent surface smoothness.

The marble chips of the invention may be prepared by curing a resin composition comprising a binder and a reactive monomer, wherein the binder comprises a halogenated alkoxylated di(meth)acrylate oligomer.

In one embodiment of the present invention, the resin composition may comprise 50 to 90 parts by weight of the binder and 10 to 50 parts by weight of the reactive monomer. In other embodiments of the present invention, the binder may further comprise halogenated urethane acrylate, halogenated epoxy acrylate or a combination thereof. The halogenated urethane acrylate may have a number average molecular weight of 900 to 4,000. The halogenated epoxy acrylate may have a number average molecular weight of 600 to 3,500.

Examples of the reactive monomers may comprise without limitation aromatic vinyl monomers, aromatic divinyl monomers, dimers thereof, alkyl or halogen substituted aromatic vinyl monomers, $C_1$-$C_{20}$ alkyl (meth)acrylates, $C_6$-$C_{20}$ aryl (meth)acrylates, hydroxyl containing (meth)acrylates, glycidyl (meth)acrylates, $C_6$-$C_{20}$ aryl phthalates, $C_6$-$C_{20}$ aryl carbonates, and the like, and combinations thereof. In exemplary embodiments of the present invention, the reactive monomers may include styrene monomer, bromo styrene, vinyl toluene, methyl (meth)acrylate, ethyl (meth)acrylate, 2-ethylhexyl (meth)acrylate, octyl (meth)acrylate, dodecyl (meth)acrylate, octadecyl (meth)acrylate, methylcyclohexyl (meth)acrylate, isobornyl (meth)acrylate, phenyl (meth)acrylate, benzyl (meth)acrylate, chlorophenyl (meth)acrylate, methoxyphenyl (meth)acrylate, bromophenyl (meth)acrylate, ethyleneglycol di(meth)acrylate, 1,2-propyleneglycol (meth)acrylate, 1,3-butanediol di(meth)acrylate, 1,3-propyleneglycol (meth)acrylate, 1,4-butanediol di(meth)acrylate, 1,5-pentanediol di(meth)acrylate, neopentylglycol di(meth)acrylate, diethyleneglycol di(meth)acrylate, triethyleneglycol di(meth)acrylate, dipropyleneglycol di(meth)acrylate, diallyl terephthalate, diallyl phthalate, diallyl carbonate, divinyl benzene, α-methyl styrene, α-methyl styrene dimer, trimethylolpropane tri(meth)acrylate, pentaerythritol tri(meth)acrylate, pentaerythritol tetra(meth)acrylate, dipentaerythritol hexa(meth)acrylate, ethoxyethyl acrylate, epoxy acrylate of glycidyl (meth)acrylic acid, 1,6-hexanediol di(meth)acrylate, glycerin tri(meth)acrylate, methylpropanediol di(meth)acrylate, polyethyleneglycol di(meth)acrylate or a combination thereof.

The resin composition may further comprise an additive selected from the group consisting of coloring agents, defoaming agents, coupling agents, ultraviolet absorbing agents, light diffusing agents, polymerization inhibitors, antistatic agents, flame retardants, heat stabilizers and the like, and combinations thereof.

In another embodiment of the present invention, the resin composition may further comprise second marble chips, and the marble chips may have a chip-in-chip structure, in which the second marble chips are formed within first marble chips.

In another embodiment of the present invention, the resin composition may further comprise a second resin composition having a different color and/or transparency as compared to a first resin composition. The second resin composition may comprise a second binder and a second reactive monomer. The second binder may include a halogenated alkoxylated di(meth)acrylate oligomer, halogenated urethane acrylate, halogenated epoxy acrylate, or a combination thereof.

In one embodiment of the present invention, the marble chips may have a specific gravity of 1.45 to 1.75, for example a specific gravity of 1.50 to 1.70.

In one embodiment of the present invention, the marble chips may have a refractive index of 1.55 to 1.75 measured in accordance with ABBE refractometer (3 T) at 25° C.

The present invention also provides a method for preparing the marble chips. The method may comprise mixing a binder comprising a halogenated alkoxylated di(meth)acrylate oligomer with a reactive monomer to prepare a resin composition; curing the resin composition to prepare a cured article; and pulverizing the cured article.

In one embodiment of the present invention, the cured article may be pulverized so as to have a diameter or a maximum diagonal length of 0.1 to 30 mm. The cured article may be pulverized after a metal is deposited onto the cured article.

The binder may further comprise a halogenated urethane acrylate, halogenated epoxy acrylate, or a combination thereof.

Also, the resin composition may further comprise an additive selected from the group consisting of coloring agents, defoaming agents, coupling agents, ultraviolet absorbing agents, light diffusing agents, polymerization inhibitors, antistatic agents, flame retardants, heat stabilizers and the like, and combinations thereof.

In one embodiment of the present invention, the resin composition may further comprise second marble chips, and the marble chips may have a chip-in-chip structure, in which the second marble chips are formed within first marble chips.

In another embodiment of the present invention, the second marble chips may include marble chips according to the present invention (which may be the same as the first marble chips of the invention or which may have a different component and/or property as compared to the first marble chips), artificial acrylic resin based marble chips, artificial unsaturated ester resin based marble chips, or a combination thereof.

In another embodiment of the present invention, the resin composition may further comprise a second resin composition having a different color and/or transparency as compared to a first resin composition, and thereby may form a flow pattern or a multilayer structure. The second resin composition may comprise a second binder and a second reactive monomer. The second binder may include halogenated alkoxylated di(meth)acrylate oligomer, halogenated urethane acrylate, halogenated epoxy acrylate or a combination thereof. The resin composition may further include multiple different resin compositions (for example, a second resin composition, a third resin composition, etc.), each having a different color and/or transparency as compared to a first resin composition.

The present invention further provides an artificial marble comprising the marble chips of the present invention. The artificial marble may comprise a matrix and the marble chips dispersed therein. In one embodiment of the present invention, the matrix may have a specific gravity of 1.52 to 1.83, the marble chips may have a specific gravity of 1.45 to 1.75, and the specific gravity difference between the matrix and the marble chips may be 2.0 or less. The matrix may be a cured article formed of a curable composition comprising acrylic syrup and inorganic filler.

DETAILED DESCRIPTION OF THE INVENTION

Figure 1:
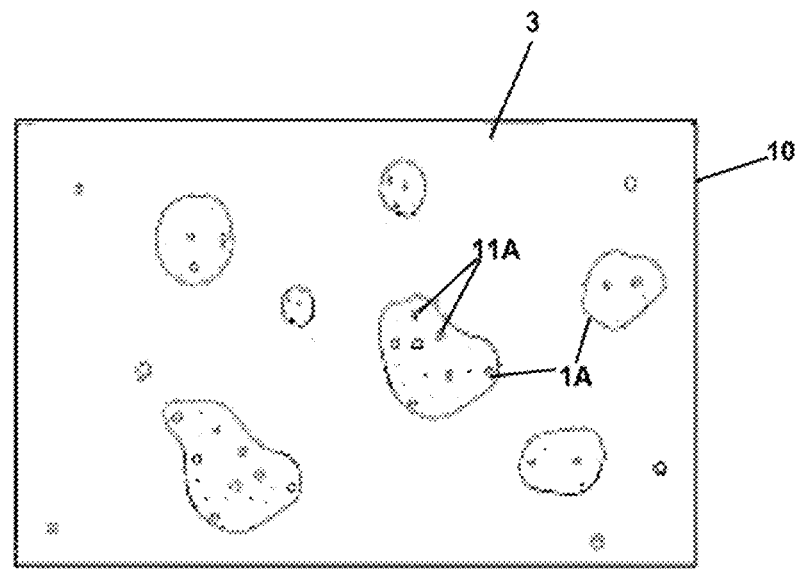
FIG. 1 schematically illustrates artificial marble including marble chips in the form of a chips-in-chip structure according to an exemplary embodiment of the present invention.

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Marble Chips

The marble chips of the present invention may be prepared by curing a resin composition comprising a binder and a reactive monomer. The binder comprises a halogenated alkoxylated di(meth)acrylate oligomer.

Examples of the halogenated alkoxylated di(meth)acrylate oligomer may comprise, without limitation, brominated alkoxylated bisphenol A diacrylate, brominated alkoxylated bisphenol A dimethacrylate, chlorinated alkoxylated bisphenol A diacrylate, chlorinated alkoxylated bisphenol A dimethacrylate, and the like. Various kinds of the halogenated alkoxylated di(meth)acrylate configured according to the number of repeating units ($-OC_2H_4-$) may be used alone or in combination thereof. A number average molecular weight of the halogenated alkoxylated di(meth)acrylate oligomer may be 600 to 4,500.

In another embodiment of the present invention, the binder may further comprise a halogenated urethane acrylate, halogenated epoxy acrylate, or a combination thereof. The halogenated urethane acrylate may have a number average molecular weight of 900 to 4,000. The halogenated epoxy acrylate may have a number average molecular weight of 600 to 3,500.

When the number average molecular weights of the halogenated alkoxylated di(meth)acrylate oligomer, the halogenated urethane acrylate and/or the halogenated epoxy acrylate are less than the above range, the crosslink density per unit volume can increase and the resin composition may be brittle. When the number average molecular weights of the halogenated alkoxylated di(meth)acrylate oligomer, the halogenated urethane acrylate and/or the halogenated epoxy acrylate are more than the above range, the crosslink density may decrease and the resin composition may be soft. Further the viscosity of the resin composition may increase so much that it may be difficult to process the resin composition.

In exemplary embodiments of the present invention, the binder may comprise 2 to 98% by weight of the halogenated alkoxylated di(meth)acrylate oligomer and 2 to 98% by weight of the halogenated urethane acrylate, based on the total weight of the binders. In another exemplary embodiment of the present invention, the binder may comprise 2 to 98% by weight of the halogenated alkoxylated di(meth)acrylate oligomer and 2 to 98% by weight of the halogenated epoxy acrylate, based on the total weight of the binders. In yet another exemplary embodiment of the present invention, the binder may comprise 1 to 98% by weight of the halogenated alkoxylated di(meth)acrylate oligomer, 1 to 98% by weight of the halogenated urethane acrylate and 1 to 98% by weight of the halogenated epoxy acrylate, based on the total weight of the binders.

In some embodiments, the binder may include the halogenated alkoxylated di(meth)acrylate oligomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98% by weight. Further, according to some embodiments of the present invention, the halogenated alkoxylated di(meth)acrylate oligomer may be present in an amount of from about any of the foregoing amounts to about any other of the foregoing amounts.

In some embodiments, the binder may include the halogenated urethane acrylate in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98% by weight. Further, according to some embodiments of the present invention, the halogenated urethane acrylate may be present in an amount of from about any of the foregoing amounts to about any other of the foregoing amounts.

In some embodiments, the binder may include the halogenated epoxy acrylate in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98% by weight. Further, according to some embodiments of the present invention, the halogenated epoxy acrylate may be present in an amount of from about any of the foregoing amounts to about any other of the foregoing amounts.

In exemplary embodiments of the present invention, the resin composition may include the binder in an amount of 50 to 90 parts by weight, for example 60 to 90 parts by weight, and as another example 70 to 90 parts by weight, based on the total weight of the resin composition. In some embodiments, the resin composition may include the binder in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 parts by weight. Further, according to some embodiments of the present invention, the binder may be present in an amount of from about any of the foregoing amounts to about any other of the foregoing amounts.

When binders are used in an amount of less than 50 parts by weight, the specific gravity of the resin composition can decrease. When the binders are used in an amount of more than 90 parts by weight, the viscosity of the resin composition may increase and the workability (processability) thereof may decrease.

In exemplary embodiments of the present invention, the resin composition may include the reactive monomer in an amount of 10 to 50 parts by weight, for example 10 to 40 parts by weight, and as another example 10 to 30 parts by weight, based on the total weight of the resin composition.

In some embodiments, the resin composition may include the reactive monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the reactive monomer may be present in an amount of from about any of the foregoing amounts to about any other of the foregoing amounts.

Examples of the reactive monomers may include without limitation aromatic vinyl monomers, aromatic divinyl monomers, dimers thereof, alkyl or halogen substituted aromatic vinyl monomers, $C_1$-$C_{20}$ alkyl (meth)acrylates, $C_6$-$C_{20}$ aryl (meth)acrylates, hydroxyl containing (meth)acrylate, glycidyl (meth)acrylates, $C_6$-$C_{20}$ aryl phthalates, $C_6$-$C_{20}$ aryl carbonates, and the like, and combinations thereof. In exemplary embodiments of the present invention, the reactive monomers may include styrene monomer, bromo styrene, vinyl toluene, methyl (meth)acrylate, ethyl (meth)acrylate, 2-ethylhexyl (meth)acrylate, octyl (meth)acrylate, dodecyl (meth)acrylate, octadecyl (meth)acrylate, methylcyclohexyl (meth)acrylate, isobornyl (meth)acrylate, phenyl (meth)acrylate, benzyl (meth)acrylate, chlorophenyl (meth)acrylate, methoxyphenyl (meth)acrylate, bromophenyl (meth)acrylate, ethylene glycol di(meth)acrylate, 1,2-propylene glycol (meth)acrylate, 1,3-butanediol di(meth)acrylate, 1,3-propylene glycol (meth)acrylate, 1,4-butanediol di(meth)acrylate, 1,5-pentanediol di(meth)acrylate, neopentylglycol di(meth)acrylate, diethylene glycol di(meth)acrylate, triethyleneglycol di(meth)acrylate, dipropylene glycol di(meth)acrylate, diallyl terephthalate, diallyl phthalate, diallyl carbonate, divinyl benzene, α-methyl styrene, α-methyl styrene dimer, trimethylolpropane tri(meth)acrylate, pentaerythritol tri(meth)acrylate, pentaerythritol tetra(meth)acrylate, dipentaerythritol hexa(meth)acrylate, ethoxyethyl acrylate, epoxy acrylate of glycidyl (meth)acrylic acid, 1,6-hexanediol di(meth)acrylate, glycerin tri(meth)acrylate, methylpropanediol di(meth)acrylate, polyethyleneglycol di(meth)acrylate, or a combination thereof.

The marble chips of the present invention may further comprise one or more additives such as but not limited to a coloring agent, defoaming agent, coupling agent, ultraviolet absorbing agent, light diffusing agent, polymerization inhibitor, antistatic agent, flame retardant, heat stabilizer, and the like. The additive may be used alone or in combination thereof.

In exemplary embodiments of the present invention, the marble chips may be in the form of chips-in-chip (that is, the marble chips of the invention can have a chips-in-chip structure). The chips-in-chip structure includes the chips of the present invention and further includes other chips (referred to herein as the "second" chips) which are different than the chips of the invention. For example, the second chips can differ with regard to size, color, shape, and the like. As an example, the chips-in-chip structure can include the second marble chips formed within the marble chips of the invention.

FIG. 1 schematically illustrates artificial marble (10) including a matrix (3) and chips distributed in the matrix and having a chips-in-chip structure according to an exemplary embodiment of the present invention. As shown in FIG. 1, the marble chips have a structure in which smaller marble chips (11A) (the second chips) are embedded in the marble chips (1A) of the invention. The present invention is not limited to a chip-in-chip structure in which the second chips are embedded in the chips of the invention, and other exemplary embodiments can include chip-in-chip structures in which the chips of the invention are embedded in the second chips.

Figure 2:
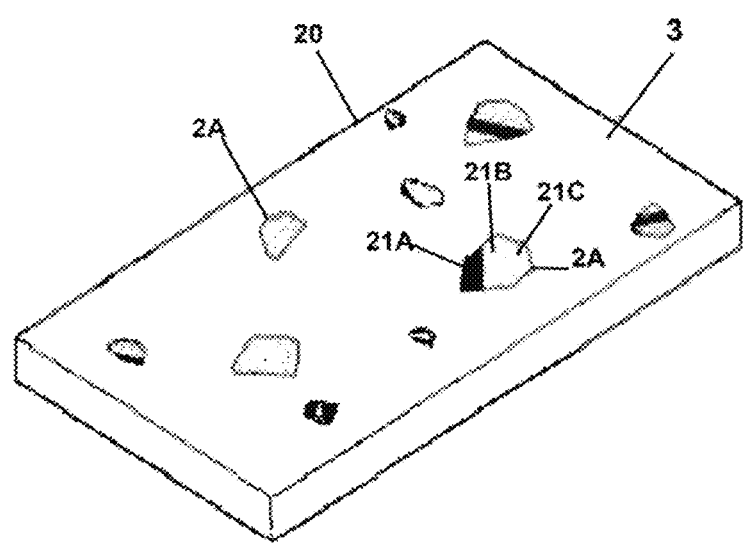
FIG. 2 schematically illustrates artificial marble including marble chips with a multilayer structure according to another exemplary embodiment of the present invention.

In another embodiment of the present invention, the marble chips may have a flow pattern or a multilayer structure, which can form a pattern. FIG. 2 schematically illustrates artificial marble (20) including marble chips (2A) having a multilayer structure according to an exemplary embodiment of the present invention. As shown in FIG. 2, the marble chips may have a multi-layered structure including a plurality of layers (such as layers 21A, 21B, and 21C) having different colors and/or transparencies.

In exemplary embodiments of the present invention, the marble chips may have a specific gravity of 1.45 to 1.75, for example a specific gravity of 1.50 to 1.70. In other embodiments of the present invention, the marble chips may have a specific gravity of 1.51 to 1.67.

In exemplary embodiments of the present invention, the marble chips may have a refractive index of 1.55 to 1.75 measured in accordance with ABBE refractometer (3 T) at 25° C.

Method for Preparing the Marble Chips

The present invention also provides a method for preparing the marble chips. The method may comprise mixing a binder comprising a halogenated alkoxylated di(meth)acrylate oligomer with a reactive monomer to prepare a resin composition; curing the resin composition to prepare a cured article; and pulverizing the cured article.

The resin composition comprises a binder and a reactive monomer, and optionally may comprise one or more additives such as but not limited to a coloring agent, defoaming agent, coupling agent, ultraviolet absorbing agent, light diffusing agent, polymerization inhibitor, antistatic agent, flame retardant, heat stabilizer, and the like, and combinations thereof. Exemplary coloring agents may comprise without limitation inorganic or organic pigments, dyes, and the like, and combinations thereof. The resin composition may include the coloring agent in an amount of 0.0001 to 10.0 parts by weight, based on 100 parts by weight of the resin composition. In other embodiments of the present invention, the resin composition may include the coloring agent in an amount of 1.0 to 5.0 parts by weight, based on 100 parts by weight of the resin composition. In other embodiments of the present invention, the resin composition may include the coloring agent in an amount of 0.001 to 0.05 parts by weight, based on 100 parts by weight of the resin composition. In other embodiments of the present invention, the resin composition may include the coloring agent in an amount of 0.05 to 2.5 parts by weight, based on 100 parts by weight of the resin composition.

In exemplary embodiments of the present invention, the resin composition may comprise a curing agent when curing. Examples of the curing agent may comprise without limitation benzoyl peroxide, dicumyl peroxide, butylhydro peroxide, cumylhydro peroxide, tert-butyl peroxy maleic acid, tert-butyl hydro peroxide, acetyl peroxide, lauroyl peroxide, azobisisobutylonitrile, 2,2'-azobis(2,4-dimethylvaleronitrile), and the like, and combinations thereof. Other examples of the curing agent may comprise without limitation a mixture of peroxide and amine or sulfonic acid compound, a mixture of peroxide and saponification salt of copper, cobalt, potassium, calcium, zirconium, or zinc, and the like. In exemplary embodiments of the present invention, the resin composition may include the curing agent in an amount of 0.03 to 2.5 parts by weight, for example 0.05 to 2.0 parts by weight, based on 100 parts by weight of the resin composition.

There is no specific limit on the curing method. In exemplary embodiments of the present invention, the resin composition may be cured at 50 to 180° C. In order to adjust the degree of curing, an amine or sulfonic acid compound may be used in combination with the curing agent, or saponification salt of copper, cobalt, potassium, calcium, zirconium, or zinc may be used in combination with the curing agent.

In exemplary embodiments of the present invention, the cured article may be pulverized so as to have an average diameter of 0.1 to 30 mm, for example 0.1 to 20 mm. A method for pulverizing may be easily carried out by a person with ordinary skill in the art.

In other embodiments of the present invention, the cured article may be pulverized after a metal such as aluminum or silver is deposited onto the cured article. When marble chips pulverized after a metal is deposited thereon are added into an artificial marble, the artificial marble can have a three-dimensional appearance and also can have a jewel-like appearance.

In another embodiment of the present invention, the resin composition may further comprise second marble chips. The second marble chips may be transparent, translucent, opaque, or a combination thereof. In exemplary embodiments of the present invention, the second marble chips may be marble chips according to the present invention, marble chips made of pulverized artificial acrylic marble, marble chips made of pulverized artificial unsaturated ester-based marble, or a combination thereof. Generally when the second marble chips are marble chips according to the present invention, the second marble chips will be different in some respect from the other chips of the invention, for example, will include a different binder and/or reactive monomer, and/or have a different size, color, shape, or other different property. When the resin composition is cured and pulverized after the second marble chips are added, the marble chips may be in the form of chip-in-chip and may provide a variety of different patterns.

In another embodiment of the present invention, the resin composition may further comprise another resin composition (referred to herein as the second resin composition) having a different color and/or transparency from the resin composition (also referred to herein as the first resin composition). The second resin composition may comprise a second binder and a second reactive monomer, wherein the second binders may include a halogenated alkoxylated di(meth)acrylate oligomer, halogenated urethane acrylate, halogenated epoxy acrylate, or a combination thereof. There may also be multiple additional resin compositions (for example, a second resin composition, a third resin composition, etc.) with different colors and/or transparencies from one another and/or from the first resin composition. Also, the second resin composition may be transparent or opaque.

When more than two kinds of resin compositions having different colors and/or transparencies are used, it is possible to impart a flow pattern and/or a multilayer structure to the marble chips. For example, in exemplary embodiments of the present invention, two or more kinds of resin compositions having different colors can be prepared and poured onto a conveyor belt for curing to form a cured article having a flow pattern can and marble chips having a flow pattern can be prepared by pulverizing the cured article.

Artificial Marble

The present invention also provides an artificial marble comprising the marble chips of the present invention. The artificial marble may be prepared by curing a curable composition comprising the marble chips and a resin syrup according to conventional methods. The resin syrup may comprise an acrylic resin or an unsaturated polyester-based resin, for example the acrylic resin. The curable composition may further comprise inorganic filler such as calcium carbonate, aluminum hydroxide, silica, alumina, barium sulfate, magnesium hydroxide, and the like, and combinations thereof, and/or conventional additives. The artificial marble can include conventional types and amounts of the various components of the artificial marble, and further the artificial marble can be readily prepared using conventional methods. The particulars thereof can be readily determined by the skilled artisan.

In one embodiment of the present invention, the artificial marble may comprise the marble chips with a specific gravity of 1.45 to 1.75. The artificial marble can accordingly have a uniform pattern and further can be prepared without requiring lengthy curing or manufacturing times and further can be prepared continuously.

In one embodiment of the present invention, the matrix may have a specific gravity of 1.52 to 1.83, the marble chips may have a specific gravity of 1.45 to 1.75, and a specific gravity difference between the matrix and the marble chips may be 2.0 or less, for example 1.7 or less, and as another example 1.5 or less, and as yet another example 1.0 or less.

In the artificial marble of the present invention, the difference between the specific gravity of the matrix and the specific gravity of the marble chips can be reduced or minimized, so that the marble chips may be uniformly dispersed in the matrix.

In embodiments of the present invention, the matrix may be a cured article formed of a curable composition comprising acrylic syrup and the inorganic filler.

In one embodiment of the present invention, the artificial marble may comprise marble chips in the form of chip-in-chip, and thereby may have a structure in which the marble chips in the form chip-in-chip are dispersed in the matrix. FIG. 1 schematically illustrates artificial marble (10) including marble chips in the form of chips-in-chip (1A). Smaller marble chips (11A) are irregularly dispersed within the marble chips (1A) of the present invention, and the marble chips in the form of chip-in-chip (1A) are dispersed in the matrix (3).

In another embodiment of the present invention, the artificial marble may have a structure in which marble chips with a multilayer structure are dispersed within the matrix, by using marble chips with a multilayer structure. FIG. 2 schematically illustrates artificial marble (20) including marble chips in the form of multilayer structure (2A). As shown in FIG. 2, the marble chips with a multilayer structure (2A) include a plurality of layers having different colors and/or transparencies (21A, 21B, 21C), and the marble chips are dispersed within the matrix (3).

The artificial marble using the marble chips can have a similar surface texture as an artificial marble including engineered stone and can have excellent processability. The artificial marble accordingly can be used in a variety of applications, including without limitation counter tops and decorative products such as kitchen sink tops, washstands or vanity tops, front desks for business establishments such as banks or stores, and the like.

In addition, the artificial marble may be used as marble chips in the form of chip-in-chip, in which transparent marble chips are formed by pulverizing the artificial marble.

The invention may be better understood by reference to the following examples which are intended for the purpose of illustration and are not to be construed as in any way limiting the scope of the present invention, which is defined in the claims appended hereto.

EXAMPLES

Examples 1-3

Preparing Marble Chips

Example 1

100 parts by weight of a resin composition comprising 80 parts by weight of bromide alkoxylated diacrylate and 20 parts by weight of methyl methacrylate is mixed with 0.2 parts by weight of benzoyl peroxide and 0.5 parts by weight of bis(4-tert-butylcyclohexyl)peroxy dicarbonate, the mixture is cured at 50° C. and pulverized to prepare high specific gravity marble chip with a specific gravity of 1.608.

Example 2

Example 2 is prepared in the same manner as in Example 1 except that 0.01 parts by weight of phthalocyanine green is further added as coloring agent. The prepared marble chip has a specific gravity of 1.609.

Example 3

100 parts by weight of resin composition comprising 90 parts by weight of bromide alkoxylated diacrylate and 10 parts by weight of styrene monomer is mixed with 0.2 parts by weight of benzoyl peroxide and 0.5 parts by weight of bis(4-tert-butylcyclohexyl)peroxy dicarbonate, the mixture is cured at 50° C. and pulverized to prepare high specific gravity marble chip with a specific gravity of 1.691.

Comparative Example 1

100 parts by weight of solution prepared by dissolving polymethyl methacrylate in methyl methacrylate is mixed with 2 parts by weight of trimethylpropane triacrylate, 0.1 part by weight of n-dodecyl mercaptan, and 1.0 part by weight of benzoyl peroxide, the mixture is cured at 50° C. and pulverized to prepare PMMA marble chips with a specific gravity of 1.183.

Comparative Example 2

Comparative Example 2 is prepared in the same manner as in Example 1 except that 100 parts by weight of unsaturated polyester resin (Aekyung Chemical, product name: TP-145X) and 1.0 part by weight of benzoyl peroxide are used. The prepared marble chip has a specific gravity of 1.203.

Comparative Example 3

Comparative Example 3 is prepared in the same manner as in Example 1 except that 100 parts by weight of vinyl ester resin (Aekyung Chemical, product name: DION-9120) prepared by polymerizing 60 parts by weight of epoxy acrylate oligomer and 40 parts by weight of styrene monomer, and 1.0 part by weight of benzoyl peroxide are used. The prepared marble chip has a specific gravity of 1.194.

Examples 4-6

Preparing Artificial Marble

Example 4

100 parts by weight of syrup prepared by dissolving polymethyl methacrylate in methyl methacrylate is mixed with 180 parts by weight of aluminum hydroxide, 2 parts by weight of trimethylpropane triacrylate, 0.1 part by weight of n-dodecyl mercaptan, 0.1 part by weight of defoaming agent, 0.1 part by weight of dispersant, and 1.0 part by weight of benzoyl peroxide. To the mixture, 50 parts by weight of the marble chips prepared in example 1 are added. The resulting mixture is stirred well and then cured at 60° C. using a continuous manufacturing method to prepare artificial marble.

Example 5

Example 5 is prepared in the same manner as in Example 4 except that the colored transparent marble chips prepared in Example 2 are used.

Example 6

Example 6 is prepared in the same manner as in Example 4 except that the marble chips prepared in Example 3 are used.

Comparative Example 4

Comparative Example 4 is prepared in the same manner as in Example 4 except that the marble chips prepared in Comparative Example 1 are used.

Comparative Example 5

Comparative Example 5 is prepared in the same manner as in Example 4 except that the marble chips prepared in Comparative Example 2 are used.

Comparative Example 6

Comparative Example 6 is prepared in the same manner as in Example 4 except that the marble chips prepared in Comparative Example 3 are used.

The properties of the artificial marbles of examples 4-6 prepared by using the marble chips prepared in examples 1-3 and the artificial marbles of comparative examples 4-6 prepared by using the marble chips prepared in comparative examples 1-3 are shown in the following Table 1.

TABLE 1

|  |  | Marble chips | | | | | | Chips | |
| --- | --- | --- | --- | --- | --- | --- | --- | --- | --- |
|  |  | Chemical Resistance Test | Specific Gravity | Refractive Index | Smoothness | Sanding Property | Concave | Distribution of Shear Plane | Heat Processability |
| Examples | 4 | Good | 1.608 | 1.593 | Good | Good | No | Good | 150 mm |
|  | 5 | Good | 1.609 | 1.592 | Good | Good | No | Good | 150 mm |
|  | 6 | Good | 1.691 | 1.607 | Good | Good | No | Good | 150 mm |
| Comparative Examples | 4 | Good | 1.183 | 1.490 | Good | Good | No | Poor | 100 mm |
|  | 5 | Poor | 1.203 | 1.531 | Good | Good | Occur | Poor | 300 mm |
|  | 6 | Good | 1.194 | 1.542 | Good | Good | No | Poor | 250 mm |

The properties of the artificial marbles as shown in Table 1 are measured in accordance with the following methods.

(1) Chemical Resistance: the marble chip is deposited into a mixture of hydrochloric acid with concentration of 1.0 N and ammonia with concentration of 1.0 N at 25° C. for 48 hours, and then the surface of the marble chip is evaluated the naked eye.

(2) Refractive Index: the refractive index of the marble chip is measured in accordance with ABBE refractometer (3 T) at 25° C.

(3) Smoothness: after a sanding process, the smoothness of the interface between the marble chip and the matrix is evaluated by the naked eye.

(4) Sanding Property: after sanding the artificial marble with sand paper, the appearance of the marble chip is evaluated by the naked eye.

(5) Concave: the term "concave" refers to cracking of the interface between the marble chip and the matrix, or depression (or "sinking") of the marble chips, and the presence of these phenomenons is evaluated by the naked eye.

(6) Heat Processability: the artificial marble is heated at 180° C. for 20 minutes, the artificial marble is subjected to curved surface machining, and the minimum radius that does not cause a overhang phenomenon of the marble chips or a cracking phenomenon is measured. Smaller radius means that the artificial marble is more curved without the overhang phenomenon or the cracking phenomenon, and that the heat processability of the artificial marble is more excellent.

As shown in Table 1, examples 4-6 exhibit good results for all of the evaluated properties, and also exhibit good heat processability. The results of the curved surface machining test are also good for Examples 4-6 with a radius of 150 mm. Comparative example 4 has the best result for heat processability, but has poor chips distribution at the shear plane. Further, comparative example 4 does not have the appearance of a texture such as quartz or engineered stone due to the low refractive index. Comparative example 5 has poor chips distribution at the shear plane, has the worst results for the concave and heat processability evaluations, and has poor chemical resistance. Comparative example 6 has poor chips distribution at the shear plane, and thus it is expected that a continuous manufacturing method for making artificial marble can used with comparative example 6.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. Marble chips prepared by curing a resin composition comprising a binder and a reactive monomer, wherein the binder comprises a halogenated alkoxylated di(meth)acrylate oligomer, and wherein the halogenated alkoxylated di(meth)acrylate oligomer comprises brominated alkoxylated bisphenol A diacrylate, brominated alkoxylated bisphenol A dimethacrylate, chlorinated alkoxylated bisphenol A diacrylate, chlorinated alkoxylated bisphenol A dimethacrylate, or a combination thereof.

2. The marble chips of claim 1, wherein the resin composition comprises 50 to 90 parts by weight of the binder and 10 to 50 parts by weight of the reactive monomer.

3. The marble chips of claim 2, wherein the binder further comprises halogenated urethane acrylate, halogenated epoxy acrylate or a combination thereof.

4. The marble chips of claim 3, wherein the halogenated urethane acrylate has a number average molecular weight of 900 to 4,000, and the halogenated epoxy acrylate has a number average molecular weight of 600 to 3,500.

5. The marble chips of claim 1, wherein the reactive monomer comprises styrene monomer, bromo styrene, vinyl toluene, methyl (meth)acrylate, ethyl (meth)acrylate, 2-ethylhexyl (meth)acrylate, octyl (meth)acrylate, dodecyl (meth)acrylate, octadecyl (meth)acrylate, methylcyclohexyl (meth)acrylate, isobornyl (meth)acrylate, phenyl (meth)acrylate, benzyl (meth)acrylate, chlorophenyl (meth)acrylate, methoxyphenyl (meth)acrylate, bromophenyl (meth)acrylate, ethylene glycol di(meth)acrylate, 1,2-propylene glycol (meth)acrylate, 1,3-butanediol di(meth)acrylate, 1,3-propylene glycol (meth)acrylate, 1,4-butanediol di(meth)acrylate, 1,5-pentanediol di(meth)acrylate, neopentylglycol di(meth)acrylate, diethyleneglycol di(meth)acrylate, triethyleneglycol di(meth)acrylate, dipropyleneglycol di(meth)acrylate, diallyl terephthalate, diallyl phthalate, diallyl carbonate, divinyl benzene, α-methyl styrene, α-methyl styrene dimer, trimethylolpropane tri(meth)acrylate, pentaerythritol tri(meth)acrylate, pentaerythritol tetra(meth)acrylate, dipentaerythritol hexa(meth)acrylate, ethoxyethyl acrylate, epoxy acrylate of glycidyl (meth)acrylic acid, 1,6-hexanediol di(meth)acrylate, glycerin tri(meth)acrylate, methylpropanediol di(meth)acrylate, polyethylene glycol di(meth)acrylate or a combination thereof.

6. The marble chips of claim 1, further comprising an additive selected from the group consisting of coloring agents, defoaming agents, coupling agents, ultraviolet absorbing agents, light diffusing agents, polymerization inhibitors, antistatic agents, flame retardants, heat stabilizers and combinations thereof.

7. The marble chips of claim 1, wherein the marble chips have a chip-in-chip structure.

8. The marble chips of claim 7, wherein the resin composition comprises first and second marble chips, wherein at least one of the first and second marble chips is prepared by curing the resin composition comprising the halogenated alkoxylated di(meth)acrylate oligomer binder and the reactive monomer, and wherein at least one of the first and second marble chips is formed within the other of the first and second marble chips.

9. The marble chips of claim 1, wherein the resin composition further comprises a second resin composition having a different color, transparency, or both, as compared the first resin composition, wherein the second resin composition comprises a second binder and a second reactive monomer, and wherein the second binder comprises halogenated alkoxylated di(meth)acrylate oligomer, halogenated urethane acrylate, halogenated epoxy acrylate, or a combination thereof.

10. The marble chips of claim 1, wherein the marble chips have a specific gravity of 1.45 to 1.75.

11. The marble chips of claim 1, wherein the marble chips have a refractive index of 1.55 to 1.75 measured in accordance with ABBE refractometer (3 T) at 25° C.

12. A method for preparing marble chips comprising:
mixing a binder comprising a halogenated alkoxylated di(meth)acrylate oligomer with a reactive monomer to prepare a resin composition, wherein the halogenated alkoxylated di(meth)acrylate oligomer comprises brominated alkoxylated bisphenol A diacrylate, brominated alkoxylated bisphenol A dimethacrylate, chlorinated alkoxylated bisphenol A diacrylate, chlorinated alkoxylated bisphenol A dimethacrylate, or a combination thereof;
curing the resin composition to prepare a cured article; and pulverizing the cured article.

13. The method for preparing marble chips of claim 12, wherein the cured article is pulverized so as to have a diameter or a maximum diagonal length of 0.1 to 30 mm.

14. The method for preparing marble chips of claim 12, wherein the cured article is pulverized after a metal is deposited onto the cured article.

15. The method for preparing marble chips of claim 12, wherein the binder further comprises halogenated urethane acrylate, halogenated epoxy acrylate or a combination thereof.

16. The method for preparing marble chips of claim 12, wherein the resin composition further comprises an additive selected from the group consisting of coloring agents, defoaming agents, coupling agents, ultraviolet absorbing agents, light diffusing agents, polymerization inhibitors, antistatic agents, flame retardants, heat stabilizers and combinations thereof.

17. The method for preparing marble chips of claim 12, wherein the marble chips are prepared to have a chip-in-chip structure.

18. The method for preparing marble chips of claim 17, wherein the resin composition comprises first and second marble chips, wherein at least one of the first and second marble chips is prepared by curing the resin composition comprising the halogenated alkoxylated di(meth)acrylate oligomer binder and the reactive monomer, and wherein at least one of the first and second marble chips is formed within the other of the first and second marble chips.

19. The method for preparing marble chips of claim 18, wherein the second marble chips comprise the marble chips of claim 1, artificial acrylic marble chips, artificial unsaturated ester-based marble chips, or a combination thereof.

20. The method for preparing marble chips of claim 12, wherein the resin composition further comprises a second resin composition having a different color, transparency, or both, as compared the first resin composition, wherein the second resin composition comprises a second binder and a second reactive monomer, wherein the second binder comprises halogenated alkoxylated di(meth)acrylate oligomer, halogenated urethane acrylate, halogenated epoxy acrylate, or a combination thereof, and wherein the marble chips have a flow pattern or a multilayer structure.

21. The method for preparing marble chips of claim 20, wherein the resin composition comprises multiple resin compositions, each having a different color, transparency, or both as compared the first resin composition.

22. An artificial marble comprising the marble chips of claim 1.

23. The artificial marble of claim 22, wherein the artificial marble comprises a matrix, wherein the marble chips are dispersed in the matrix.

24. The artificial marble of claim 23, wherein the matrix has a specific gravity of 1.52 to 1.83, the marble chips have a specific gravity of 1.45 to 1.75, and a specific gravity difference between the matrix and the marble chips is 2.0 or less.

25. The artificial marble of claim 24, wherein the matrix is a cured article of curable composition comprising acrylic syrup and inorganic filler.

* * * * *